(12) United States Patent
Alexander et al.

(10) Patent No.: US 8,176,252 B1
(45) Date of Patent: May 8, 2012

(54) DMA ADDRESS TRANSLATION SCHEME AND CACHE WITH MODIFIED SCATTER GATHER ELEMENT INCLUDING SG LIST AND DESCRIPTOR TABLES

(75) Inventors: Praveen Alexander, Whitehall, PA (US); Heng Liao, Belcarra (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 901 days.

(21) Appl. No.: 12/203,455

(22) Filed: Sep. 3, 2008

Related U.S. Application Data

(60) Provisional application No. 60/989,846, filed on Nov. 23, 2007.

(51) Int. Cl.
*G06F 13/00* (2006.01)

(52) U.S. Cl. ............ 711/118; 711/154; 710/22; 710/23; 710/26

(58) Field of Classification Search .................... 710/22, 710/23, 26; 711/118, 154
See application file for complete search history.

(56) References Cited

U.S. PATENT DOCUMENTS

| | | | |
|---|---|---|---|
| 5,301,287 A | 4/1994 | Herrell et al. | |
| 5,386,524 A | 1/1995 | Lary et al. | |
| 5,473,761 A | 12/1995 | Parks et al. | |
| 5,497,496 A | 3/1996 | Ando | |
| 5,708,849 A | 1/1998 | Coke et al. | |
| 5,991,854 A | 11/1999 | Watkins | |
| 6,012,106 A | 1/2000 | Schumann et al. | |
| 6,754,735 B2 | 6/2004 | Kale et al. | |
| 6,886,171 B2 | 4/2005 | MacLeod | |
| 7,216,218 B2 * | 5/2007 | Wilson ........................... 712/226 |
| 7,249,242 B2 | 7/2007 | Ramchandran | |
| 7,523,228 B2 | 4/2009 | Biran et al. | |
| 7,620,749 B2 | 11/2009 | Biran et al. | |
| 7,877,524 B1 * | 1/2011 | Annem et al. ................... 710/26 |
| 2006/0090016 A1 * | 4/2006 | Edirisooriya ................... 710/22 |
| 2006/0265568 A1 * | 11/2006 | Burton ........................... 711/216 |
| 2007/0162643 A1 | 7/2007 | Tousek | |
| 2007/0266206 A1 * | 11/2007 | Kim et al. ...................... 711/118 |
| 2008/0065855 A1 | 3/2008 | King et al. | |
| 2008/0126602 A1 | 5/2008 | Biran et al. | |
| 2008/0209130 A1 | 8/2008 | Kegel et al. | |

OTHER PUBLICATIONS

IEEE Standard for Commmunicating Among Processors and Peripherals Using Shared Memory (Direct Memory Access-DMA), ANSI, IEEE Std 1212.1-1993, Dec. 2, 1993, Enitre 134 Pages.*

* cited by examiner

*Primary Examiner* — Hong Kim
(74) *Attorney, Agent, or Firm* — Dennis R. Haszko

(57) ABSTRACT

A scatter gather element based caching system is provided along with a modified scatter gather element, that supports efficient logical to physical address translation for arbitrarily aligned and arbitrarily sized fragment (segment) based memory management schemes. This is different from modern CPU implementations with MMUs that support page-based implementations. A primary application of embodiments of the present invention is in DMA applications. The system enables frequent switching of contexts between I/Os using a novel caching technique. An embodiment of the present invention also includes the modification of the conventional scatter-gather element used in DMA for supporting multiple memory spaces, backward list traversals, better error recovery and debugging.

22 Claims, 14 Drawing Sheets

DMA ADDRESS TRANSLATION SCHEME AND CACHE WITH MODIFIED SCATTER GATHER ELEMENT INCLUDING SG LIST AND DESCRIPTOR TABLES

CROSS-REFERENCE TO RELATED APPLICATIONS

This application claims the benefit of priority of U.S. Provisional Patent Application No. 60/989,846 filed on Nov. 23, 2007, which is incorporated herein by reference in its entirety.

FIELD OF THE INVENTION

The present invention relates generally to address translation caches, such as memory management unit (MMU) and translation look-aside buffer (TLB) structures. More particularly, the present invention relates to direct memory access (DMA).

BACKGROUND OF THE INVENTION

A DMA transfer essentially copies a block of memory from one device to another. The block of memory that resides in these devices may be further subdivided into smaller chunks that may not be contiguously located. For example, a 4 MB chunk may be located as 4 separate 1 MB chunks anywhere in the memory space of the device. Therefore, some information is needed as to their physical locations so that the DMA Master (the DMA controller) can then use this information to either collect the data from these separate chunks (Gather) or write data into these separate chunks (Scatter). This is where a Scatter/Gather element comes into the picture.

A Scatter/Gather element contains the physical location of one memory chunk (also called a fragment) along with the size of the data contained in that chunk. A number of Scatter/Gather elements together can describe the locations and sizes of the chunks of memory that make up the block of data to be transferred. The format of a Scatter/Gather element can be different depending upon the application. For the purpose of uniformity, the IEEE 1212.1 compliant Scatter/Gather element, which is illustrated in FIG. 1, will be described.

As shown in FIG. 1, a typical Scatter/Gather element has the following fields: a 64-bit Address field 100 that points to the starting location of the fragment in memory; a 32-bit Length field 102 that indicates the amount of data contained in that particular fragment; a 31 bit Reserved field 104 that is set to zeroes; and a 1 bit Extension (Ext) field 106 that indicates whether this element is a pointer to the next SG element or not. This Extension field 106 is needed because the SG elements themselves may not be stored contiguously in memory. In this case, the Address field 100 of an SG element can be used to point to the location of the next SG element in the list. For such an SG element, the Length field 102 is ignored and the Ext 106 bit will be set. A Scatter/Gather element may also have a Length field set to all zeroes, which can mean: that the DMA controller should ignore the contents of this element and move on to the next element in the list; or that the block is empty.

FIG. 2 shows how a Scatter/Gather List (also called SGL, a chained list of Scatter Gather elements) can be used to completely specify a block of memory in a device. As shown in FIG. 2, Fragments 0 through 4 are located at non-contiguous and random locations in physical memory 108 (which may reside in different memory spaces). The SGL 110 however puts all of these together by having SG elements 112 that point to the starting location of each fragment. As we traverse the list, we appear to have a contiguous logical memory block, whose total size is the combined sizes of all of the fragments. An illustration of such a logical memory block 114 is shown in FIG. 2 for illustrative purposes, though it is understood not to exist physically.

Notice in the example of FIG. 2 that the SGL 110 itself is not contiguously located in physical memory. The fifth SG element of the first set of SG elements points to the next SG element in the list by using the extension capability of the SGL. Also notice that we cannot traverse the list backwards—for example, we cannot go back to the fifth SG element once we traverse on to the sixth one, as we have no information in the sixth SG element that points back to the address of the fifth SG element.

The DMA controller may have a number of SGLs in memory, each corresponding to a different logical block of memory that is involved in a data transfer. Each SGL may be identified using a unique data word, also called a descriptor. Each descriptor typically contains the starting location of a particular SGL (or SGLs) in physical memory, which physical memory contains the SGL(s) (if there are multiple separate physical memories), the total size to be transferred, and other details pertaining to that particular data transfer. This way, the CPU can simply instruct the DMA controller to initiate a data transfer by giving it the descriptors. The DMA controller can then find the starting address of the first SGL using the descriptor, and then proceed to transfer data by using the information obtained from traversing the SGL.

The starting address of the SGL itself can be 64 bits (depending on the system), which could make the descriptor large. In order to conserve space on the descriptor fields, descriptor information can be stored in physically contiguous locations in memory and the descriptor itself can be used to point to this information. This memory structure is called a descriptor table. In this case, the descriptor itself can be reduced to a simple index, which can then be manipulated and then added to an offset to arrive at the location of the actual contents of the descriptor in physical memory.

FIG. 3 illustrates a scatter gather list descriptor table. For the purposes of illustration, assume that each entry in the descriptor table 116 holds only the starting address of the SGL. Each descriptor 118 is simply represented as an integer and is nothing more than an index in this case. To locate the entry in the descriptor table, the descriptor is multiplied by 8 bytes (since each descriptor entry is 64-bits wide and holds the starting address of the SGL) and an offset value (0x1000 in this case) is added to the multiplied value to arrive at the location 120 of that descriptor's contents. In the case where the descriptor value is 1 for example, we find the contents of the descriptor at memory location (1*8)+0x1000=0x1008 in physical memory 122. We can then use the contents at this memory location (0xffe0 in this case) to get our first SG element in the SGL.

After the data transfer is complete, the DMA controller will interrupt the CPU to inform of a successful transfer. The CPU may then 'retire' the descriptor, wherein it may re-use this particular descriptor for another DMA transfer by storing the starting address of a completely different SG list in the descriptor table. (In the example above in FIG. 3, the CPU will overwrite the address 0x1008 with a value other than 0xffe0). Until now, we have assumed only a simple descriptor (only an index) and a simple descriptor table (SG element address) for this example. In reality, the descriptors may hold many more bits that may be used to indicate other parameters in the DMA transfer.

A structure of a more complex descriptor is shown in FIG. 4 and relevant portions are described below. A Source Descriptor Index 124 (N bits wide) holds the descriptor index that is required by the controller to locate the Descriptor table for the Source of data for the transfer. Src DT Location 126 (M bits wide) bits indicate which memory space contains the Descriptor Table for the Source of the Data Transfer, such as in the case where there are multiple memories in the system. For example, there can be 3 addressable memory spaces—a DDR DRAM memory space, a PCI Host memory space and a GSM on-chip embedded memory space. This scenario can apply to each of the portions described below in relation to FIG. 4 that indicate which memory contains a certain element of interest.

Src SGL Location 128 (P bits wide) bits indicate which memory contains the Scatter Gather List for the Source of the data transfer. Dest Descriptor Index 130 (N bits wide) holds the descriptor index that is required by the controller to locate the Descriptor table for the Destination of data for the transfer. Dest DT Location 132 (M bits wide) bits indicate which memory contains the Descriptor Table for the Destination of the Data Transfer. Dest SG Location 134 (P bits wide) bits indicate which memory contains the Scatter Gather List for the Destination of the data transfer. Finally, Transfer Size 136 (Y bits wide) indicates how many total bytes are to be transferred for this particular DMA operation.

Using the descriptor and the SGLs, a DMA controller (DMA Master) can transfer data to and from devices. The DMA Master will read through the descriptors, locate the SGLs and then proceed to transfer information from one device to another. Some DMA controllers may use temporary buffers that hold the data read from one device, before it is written into the other device. For example, a DMA controller may choose to transfer 1 KB at a time between devices until the entire transfer is finished. Therefore it will first traverse as many source device SG elements as it needs to fill up this 1 KB buffer. It will then proceed to write this 1 KB by reading as many destination device SG elements. This is usually done for performance and ease of transfers.

Fragment size and alignment: Consider virtual memory management in a Host CPU and operating system. Modern CPUs use intelligent MMUs, which utilize a hierarchy of segment and/or page tables to map a logically contiguous user memory space for each process into the physical memory hierarchy, for protection of one user space from another, and provide a linear view of memory from each user process. Furthermore, this also allows the logical memory space to be much larger than the actual physical main memory space by swapping certain regions of logical memory that are currently not in use with much larger disk swap space.

Before a data buffer can be used as a DMA data buffer, typically, the application layer allocates a data buffer in virtual address space. The kernel or device driver page lock the virtual address buffer to ensure the entire virtual address buffers are loaded and fixed in physical main memory space (no swapping to disk). Since the virtual to physical address translation is done based on MMU 'pages' (e.g. 4K byte long physical memory that is perfectly aligned at 4K address boundaries for example), the virtual buffer is now mapped into a sequence of physical pages, each page being uniform in size and alignment that can be presented by a SGL.

However, since the virtual address buffer can start at arbitrary byte address granularity, the first byte of the virtual address buffer can start from an arbitrary byte offset of a physical page. In other words, the SGL represents a sequence of uniform size pages that are page aligned, except for the first fragment that can start at an arbitrary byte offset of a page, and the last fragment can end at an arbitrary byte offset of another page. This approach is well suited for limited SGL buffers denoted as "page fragments", where the size and alignment of a fragment is fixed. But because of the page index based lookup structure, this approach can only handle uniform size buffer fragments, therefore can not support "arbitrary fragments" that have no restrictions on the alignment and the size of each buffer fragment.

Performance: Assume that Scatter Gather Lists contain extension elements, which means that the DMA controller has to traverse the list for a while before getting to the next SG element that contains valid fragment information. FIG. 5 shows how a typical DMA controller may spend its time on a DMA operation (either when Reading or Writing).

As shown in FIG. 5, the Master first spends time 138 on locating the Descriptor Table to get the address of the first SG element. Once this has been obtained, the Master then traverses the SG list until it finds the first SG element that contains a data fragment (this portion of time is indicated as 'SG frag 1' 140 in FIG. 5). The DMA Master then transfers data to/from the fragment during time 142. When this is finished, the DMA Master then searches for the next fragment to transfer data, and thus once again traverses the SG List to find the next fragment during time 144. Once the second fragment has been found, the Master can now transfer data to/from the second fragment during time 146. Other time periods 148 and 150 represent similar searching and data transfer, which can be repeated for the required number of SG elements. As we can see, the efficiency of data transfers is affected because the Master has to traverse SG lists between data transfers in order to find fragments. In reality, the performance will be even worse, as the Master has to fetch the SG Lists of both the Source and the Destination when transferring data between them. Also note that the time taken to fetch SG elements keeps increasing as the Master has to traverse down the list, because it has to skip over n−1 SG elements to find the nth element, which further degrades performance.

Maintaining Context: The majority of known DMA operates in physical address space. This means the requestor of a DMA operation specifies a DMA request using physical addresses, or a scatter gather list that contains physical address information on each DMA operation. This approach is quite intuitive and simple when handling data movement in contiguous data buffers. But when the DMA operation needs to do context switching between partial transfers using different scatter-gather lists, the use of physical addressing pushes a significant burden on the DMA Master (requestor). To enable the DMA to resume data transfer on a partial SGL buffer, the DMA Master needs to save much information in SGL partial transfer context, including: the current pointer in SGL, the head pointer to the SGL, the current fragment physical address, the remaining byte count within the current fragment. Such context needs to be managed on per concurrent SGL basis.

When the DMA resumes data transfer on a SGL buffer, the DMA Master needs to reload the partial context to allow proper physical address calculation. The SGL partial context not only adds very significant complexity to both the DMA engine, the DMA Master, but also adds cost for the context storage, and reduces the performance of DMA engine because of the extra processing step involved in context management. This problem can be particularly severe in the storage controller application that needs to support a large number of concurrent I/Os (SGLs) that are time interleaved over the physical bus.

For example, assuming that the SG List contained elements each containing fragments of 1 byte (Length field=1), the Master would have the information contained in the eighth SG element during the transfer of the eighth byte of data. The Master must also keep track of the total data transferred by adding the Length fields of all the fragments in the SG elements that it had traversed so far. This should be done in order to keep track of when to stop transferring data. For example, even though the Master fetches the eighth SG element, which has a fragment of size 1 byte, it has to know that this is the eighth byte being transferred in order to keep track of the total bytes transferred. If at this time, the DMA Master had to abort this transfer and then subsequently retry it or if it had to retry starting from (for example) the seventh byte of data, it would have to traverse the SG List starting from the descriptor table, as it does not have the information required to traverse backwards (a fundamental limitation of SG Lists, as discussed earlier). This again results in a wastage of bandwidth and performance.

Error Recovery and Debug: Most SG lists are created by drivers that run on the Host operating system. Imagine a case where a driver has a bug, wherein the transfer size is larger than the total size of the memory block contained in an SG list. The DMA Master cannot tell the end of an SG list. If it has more data to transfer, it will move on to the memory locations immediately after the last correct SG element and incorrectly assume that it is the next SG element. It would then interpret the random data in those memory locations as contents of an SG element. Two scenarios can happen in this case:

1. The DMA Master could attempt to read/write to a non-existent address. This could cause a memory error leading to a system crash.

2. The DMA Master could potentially overwrite valuable data on an existent unintended location pointed to by the false SG element, causing a system crash or other potentially fatal failures. The problem with this type of error is that the system may not immediately fail, but may fail later when it attempts to use the data that has been overwritten by the DMA Master.

It is, therefore, desirable to provide an address translation scheme and cache with a modified scatter gather element.

SUMMARY OF THE INVENTION

It is an object of the present invention to obviate or mitigate at least one disadvantage of previous scatter gather and DMA approaches.

Due to the shortcomings of both the physical address DMA (maintaining context) and virtual address DMA (no support for arbitrary fragment size and alignment), there exists a need to solve the DMA address translation by treating each logical data buffer as one independent linear logical space, while the underlying physical memory is defined by an SGL with arbitrary fragments. Embodiments of the present invention are designed to work with memory systems that employ arbitrarily sized and aligned fragments.

In an aspect, the present invention provides a scatter gather cache module including a main memory interface, an SG cache memory and a memory management system interface. The main memory interface reads SG lists and descriptor tables from main memory and modifies SG element information prior to storage. The SG cache memory stores SG element context in one or more cache lines including modified SG element information regarding one or more SG elements for a particular descriptor. The memory management system interface interfaces with a memory management system controller to exchange information about SG elements.

The SG cache memory can store SG element context and memory space location for memory fragments with non-uniform alignment and/or length. The main memory interface can manipulate the entire contents of the length field of an SG element to calculate an accumulated length value for storage in the cache line. The main memory interface can determine a remaining byte count for the SGL based on the calculated accumulated length value. The main memory interface can compress SG element information prior to storage in the SG cache memory, such as by removing reserved bits from the SG element information prior to storage.

The main memory interface can proactively pre-fetch SG elements before they are needed by a memory management system controller. The memory management system interface can be a DMA master interface to interface with a DMA Master.

The one or more cache lines can store a partial address of a previous SG element to permit traversing backward through the SGL. The one or more cache lines can include: an accumulated start offset field including information to calculate the amount of data contained in a fragment referenced by a particular SGL element; one or more accumulated end offset fields containing information required to calculate the amount of data contained in memory fragments referenced by the one or more SG elements; one or more cache line memory space location fields to indicate a memory space location for each SG element represented in the cache line; and one or more SGL element addresses including the starting address of the memory fragments referenced by one or more SG elements in the cache line.

The main memory interface can compute an accumulated length value for storage in the one or more accumulated end offset fields by adding the length of a particular SG element to the length of all previous SG elements in the cache line. The main memory interface can omit the length of an extension SG element in the computation of the accumulated length value.

Each cache line can further include: a valid field to indicate whether the current line contains valid information, or if the cache location is empty; a tag field to hold upper bits of a descriptor index and memory space location of the corresponding descriptor table; and a next SG element/extension address field to store the starting address of the next SG element in the current SG list that occurs after the last SG element in the cache line. Each cache line can further include a field that stores the address of the first SG element in a cache line. The tag field can include a bit to associate a DMA master with SG elements stored in the cache line.

The SG cache module can further include a hit-test module to provide a contiguous buffer view to the DMA master. The hit-test module can determine whether SG fragment information requested by a DMA master resides in the cache based on a comparison of tag field bits with upper bits of the descriptor and a comparison of a completed byte count with the accumulated start and end offset fields, and a value of the valid field.

In another aspect, the present invention provides a direct memory access system. The system includes: a system bus (or memory bus), a central processing unit connected to the system bus; a main memory connected to the system bus; a DMA master connected to the system bus and in communication with input/output devices; and a scatter gather cache module connected to the system bus. The SG cache module can include a main memory interface, an SG cache memory and a DMA master interface (similar to the memory management system interface), with features as described above.

The SGLs can be stored in secondary memory that has slower access time than the main memory. The system can include a second DMA master, in which case the SG cache module can further include a second DMA master interface to permit the SG cache module to be shared between the two DMA masters. Alternatively, the system can further include a second DMA master and a second SG cache module for dedicated interaction with the second DMA master. The SG cache module can be located between the memory that holds the descriptor table and/or the SGLs and the system bus to determine whether a descriptor table or SG access occurs and proactively pre-fetch SG elements from memory.

In a further aspect, the present invention provides a method for logical to physical address translation for arbitrarily aligned and arbitrarily sized segment based memory management schemes. The method includes the following steps: receiving a descriptor index and transferred byte count from a memory management system controller; accessing a scatter gather cache memory to determine whether information is stored pertaining to the received descriptor and, if not, accessing a main memory to find a descriptor table location for the descriptor index, which points to the starting address of the first SG element in the SG list; storing the highest order bits of the descriptor index in a tag field in the SG cache memory, along with SG element memory space location information for the descriptor table; reading each SG element and preparing for modification and storage of SG element information into a cache line in the SG cache memory; for each SG element read, accumulating length fields into the cache line by adding the length of a current SG element to the length of all previous SG elements in the cache line, and copying an SG element memory space location; for each cache line, copying next SG element address information from the last address in the cache line; and returning information about the first segment to the memory management system controller.

The method can further include comparing an accumulated length field value with a completed byte count to determine which SG element information to return.

In a yet further aspect, the present invention provides a memory for storing data for access by an application program being executed on a data processing system, comprising a data structure stored in said memory, said data structure representing an SG element. The data structure comprises: a scatter gather element including: a plurality of address bits to point to the starting location of a memory fragment; a plurality of length bits to indicate the amount of data contained in the memory fragment; an extension field to indicate whether the SG element is a pointer to the next SG element; a memory location field to specify a physical memory location for the SG element from among a plurality of physical memory locations; and an end of buffer field to specify whether the SG element is the end of the SG list.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
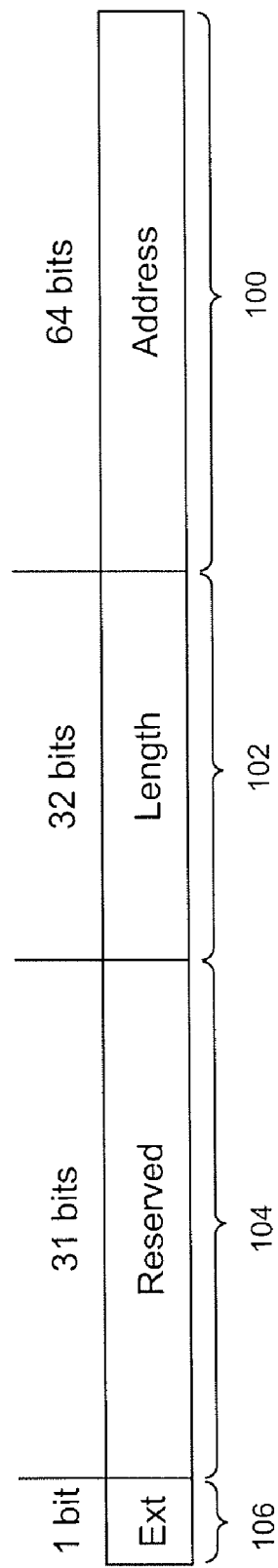
FIG. 1 illustrates a scatter gather element.
Figure 2:
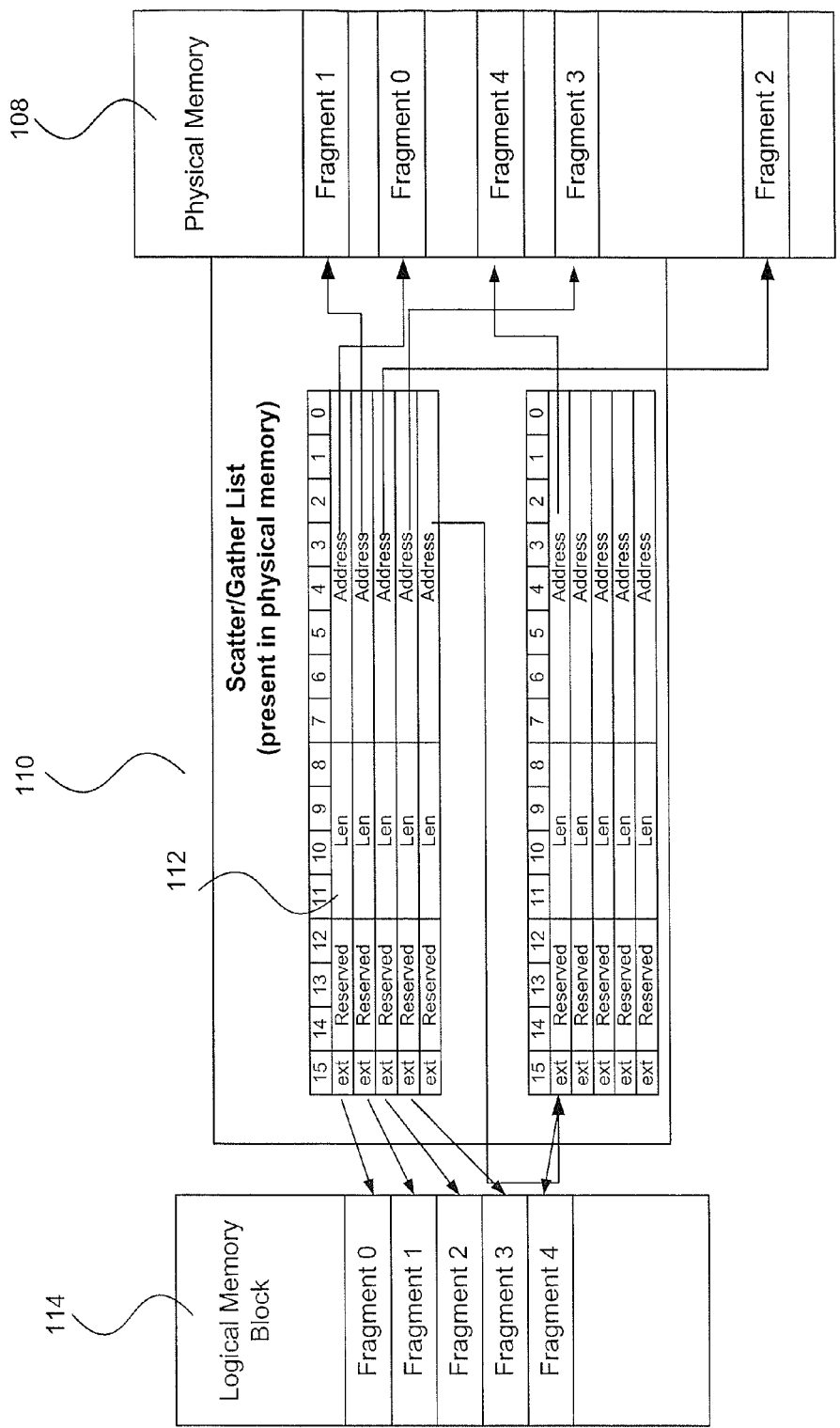
FIG. 2 illustrates a scatter gather list.
Figure 3:
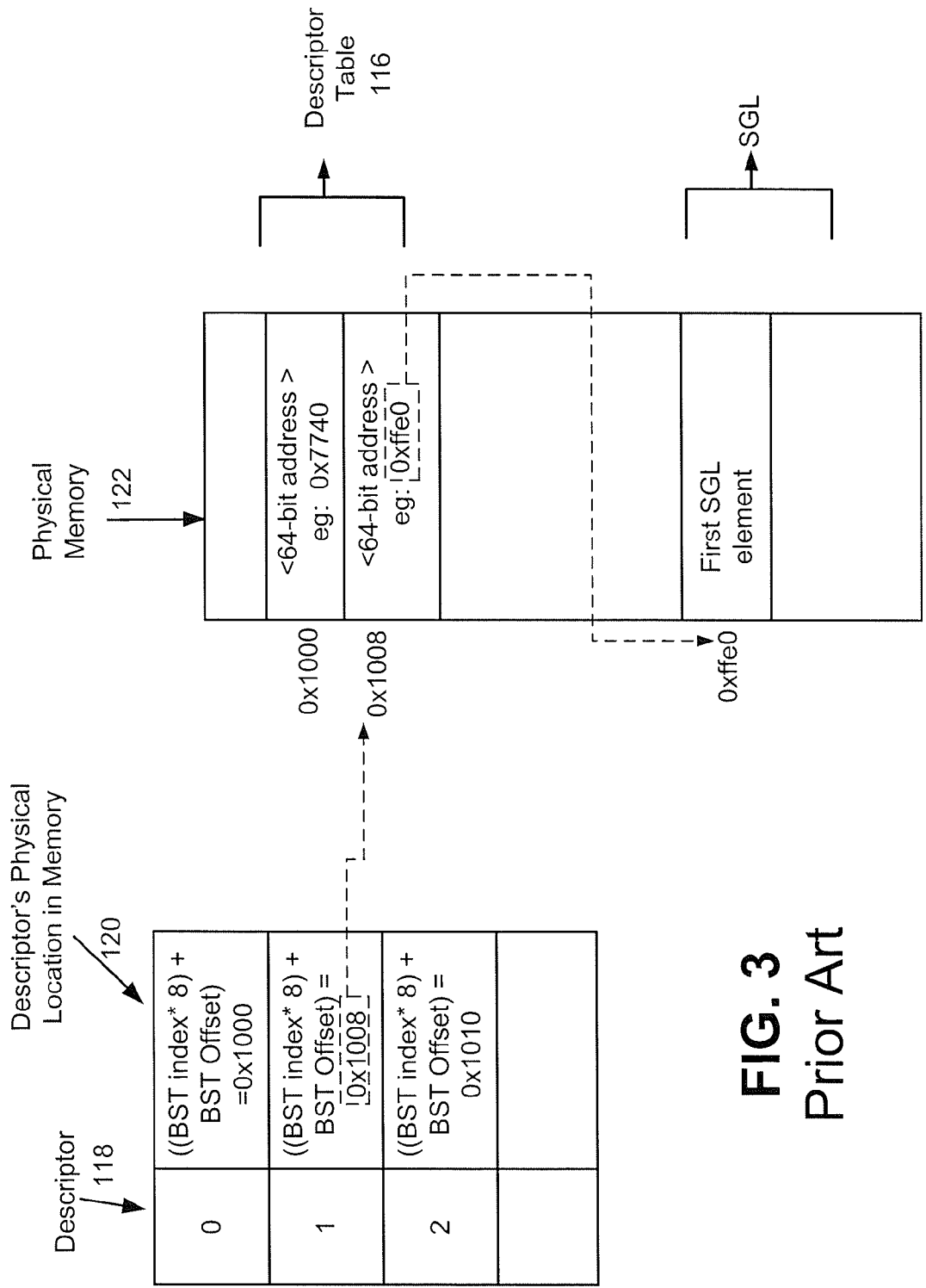
FIG. 3 is an example of a scatter gather list descriptor table.
Figure 4:
FIG. 4 illustrates a scatter gather list descriptor format.
Figure 5:
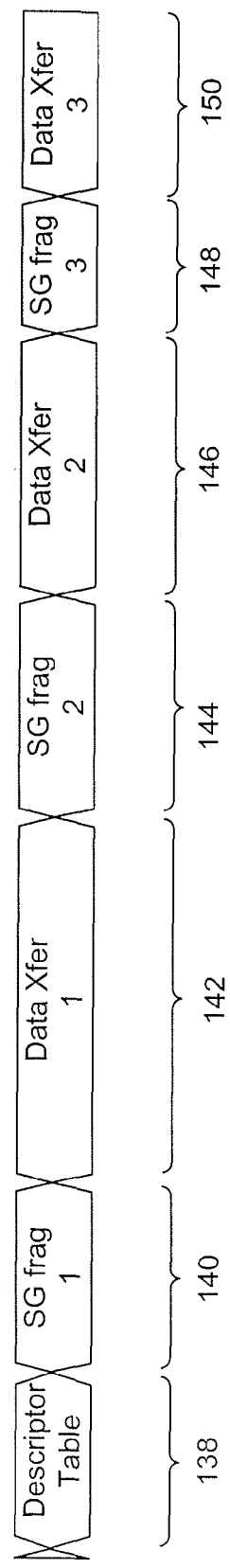
FIG. 5 illustrates a conventional DMA timing diagram.

Generally, the present invention provides a scatter gather element based caching system along with a modified scatter gather element, that supports efficient logical to physical address translation for arbitrarily aligned and arbitrarily sized fragment (segment) based memory management schemes. This is different from modern CPU implementations with MMUs that support page-based implementations. A primary application of embodiments of the present invention is in DMA applications. The system enables frequent switching of contexts between I/Os using a novel caching technique. An embodiment of the present invention also includes the modification of the conventional scatter-gather element used in DMA for supporting multiple memory spaces, backward list traversals, better error recovery and debugging.

The Scatter/Gather block_descriptor will be addressed as a 'Scatter/Gather element' for the remainder of this document.

In order to overcome the problems presented earlier, embodiments of the present invention now introduce a context storing cache and a modified SG element that supports arbitrarily aligned and sized fragments in multiple memory spaces, and aides error recovery. These fragments can be described as having an unrestricted or unconstrained fragment size, which can be referred to as variable, unequal or irregular. The alignment of the fragments can be described as unrestricted or unconstrained, variable or irregular.

Supporting arbitrarily sized fragments avoids unnecessary memory movement. For example, a user program wants to write some data fields from various data structures into a file. Instead of allocating a contiguous data buffer in the virtual address space as a temporary workspace to copy all the necessary fields before issuing the I/O from the workspace buffer, the user program chooses to create a SGL with each entry pointing to the direct location of the necessary data structure fields to be written. Then, the write I/O is issued to the file system using the SGL as the argument representing the I/O buffer. This creates an I/O operation using an arbitrary SGL with the benefit of eliminating the extra step of managing the workspace buffer and the data movement between the data structure and the workspace.

A primary purpose of the cache is to store SG element context (similar to how a TLB would do in a MMU) and this drives the organization of the cache. However, another feature of the cache is to proactively pre-fetch SG elements before they are needed by the DMA Master, and to also keep track (depending on the configuration of the cache) of previously fetched SG elements to avoid traversing the SG list from the start.

Another feature of the cache is its ability to avoid writes into the cache by modifying and compressing the SG element before storage. In addition, the cache also uses the modified SG element in order to find the end of the SG list, which helps error recovery and debugging much easier. There are several possible configurations of the cache, including its position and placement in the system, which will be different depending on the application and performance required.

The context storing cache can be organized in a variety of ways depending on the requirements of the system. In general, each cache line (or cache entry) comprises information regarding one or more SG elements for a particular descriptor. Along with this information, the higher order bits of the descriptor and other details (like the memory space location of the Descriptor Table) are stored as a tag. This is done so the cache can distinguish between various descriptors and memory spaces where the descriptor could be located. The associativity of the cache depends upon the system and the desired performance. All other things being equal, a cache with full associativity will give the better performance, but would likely require more area (for storing tag bits) and tighter timing constraints. A direct-mapped cache will be assumed for the purposes of explaining one variant of the design, though other variations are possible in other embodiments.

Figure 6:
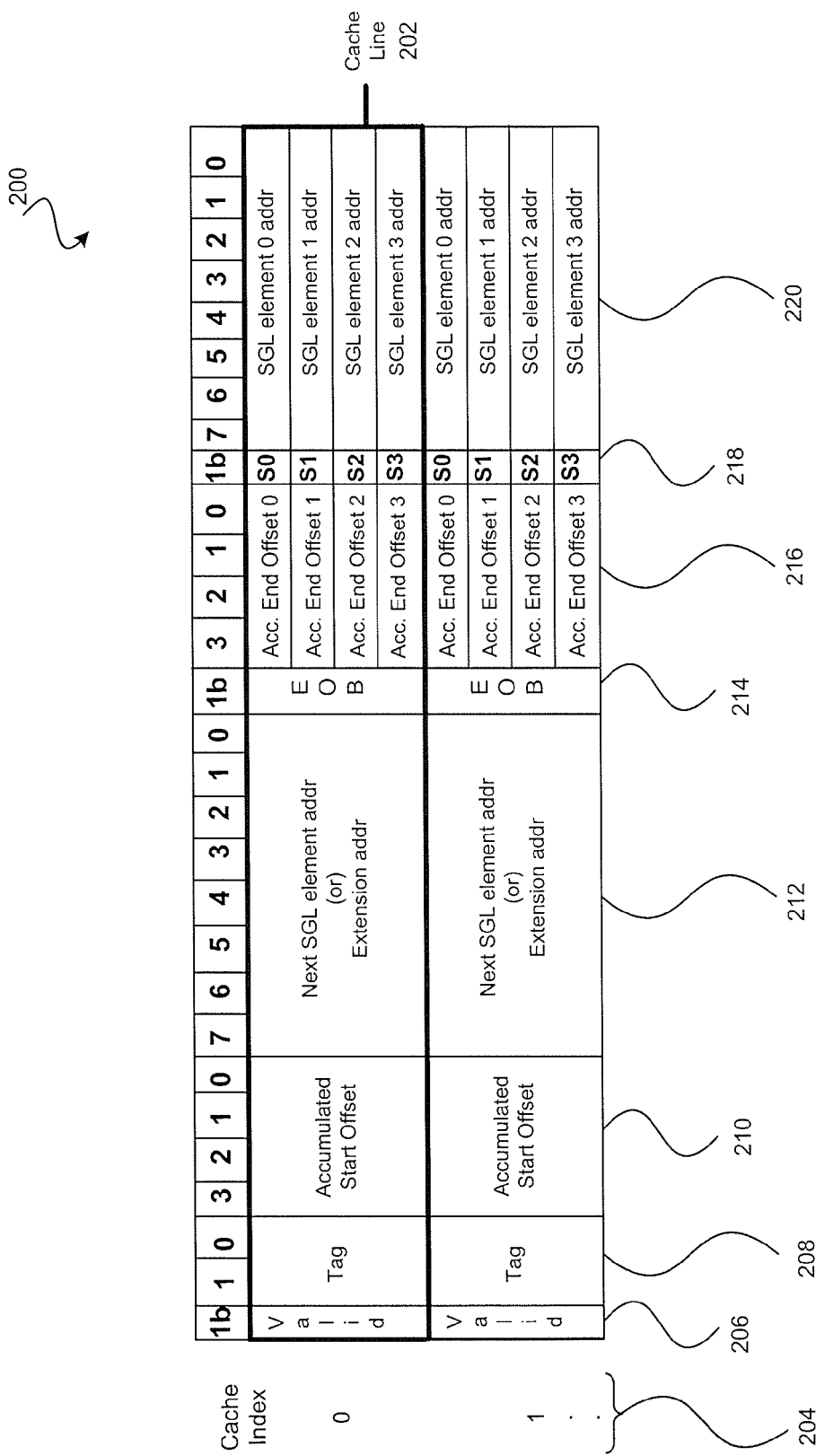
FIG. 6 illustrates organization of a direct-mapped cache line according to an embodiment of the present invention.

FIG. 6 shows an example of how a direct-mapped cache line can be organized. In the embodiment of the cache design 200 in FIG. 6, every cache line 202 holds information on up to four SG elements in the SG list for that particular Source or Destination descriptor index 204. Other embodiments can hold more or less element information, or can choose to combine the information for both Source and Destination SG lists in the same line.

The cache may not store all of the information contained in a typical SG element, and can modify the information contained in an element for improving performance. In other words, the information stored for an SG element in the cache line 202 can be a modified version of the information contained in the SG element itself. For example, if all the fragments in the system are always aligned to 1 Kbit boundaries, then we can reduce the number of bits needed to store the starting address of the fragment by 10 bits, since we know that they will always be zeroes. Also, the 'Reserved' portion of the SG element may not be stored, as this will usually be set to all zeroes in an SG element. Some SG element fields can be modified before storage—for example, this particular design accumulates the 'Length' field of an SG, instead of storing the original value. Other, similar variations apply to the other fields in an SG element described herein.

The embodiment of the cache design 200 in FIG. 6 houses the following fields in every cache line 202. A validity field, or valid field, 206 indicates whether the current line contains valid information, or if this cache location is empty. This field can be used to flush out or retire a descriptor after a transfer is complete. A tag field 208 holds the upper bits of the descriptor index along with other information such as the memory space locations of the Descriptor Table. For example, 'Tag' can hold upper bits of either Source or Destination descriptor index, plus some bits for Descriptor Table memory space location. Accumulated Start Offset field 210 contains information required to calculate the amount of data contained in the fragment that is contained in SGL element 0. In another embodiment, the Tag field can also be used to store other information. A bit in the Tag field can be used to associate a DMA master with SG elements stored in the cache line. For example, in a situation where there are two DMA Masters DMA1 and DMA2, one bit in the Tag field can be used to differentiate between which Master's SG elements are stored in the cache line.

Next SG element Address or Extension Address field 212 contains the starting address of the next SG element in the list that occurs after the last SG element in the cache line, which is SG element 3 in the embodiment of FIG. 6. In most simple cases, the next consecutive address is obtained by adding 16 to the address of SG element 3 (since each SG element is 16 bytes wide). If one of the SG elements in the cache (0, 1, 2 or 3) was an extension SG element, then this field is filled with the extension address from that element. A cache line end of buffer (EOB) field 214 indicates that one of the SG elements in the cache (0, 1, 2 or 3) is the end of the SG list.

One or more accumulated end offset fields 216 are provided in each cache line. The example in FIG. 6 includes four such fields per cache line. Accumulated End Offset 0 contains information required to calculate the amount of data contained in the fragment that is contained in SGL element 0. Similarly, the Accumulated End Offset 1, 2 and 3 fields contain information required to calculate the amount of data contained in the fragment that is contained in SGL elements 1, 2 and 3, respectively.

The total data length of the fragment in SGL element 0 is calculated as:

SGL Element 0 Fragment Length=Accumulated End Offset 0−Accumulated Start Offset.

Similarly, the total data length of the fragment contained in SGL elements 1, 2 and 3 are calculated as follows:

SGL element 1 Fragment Length=Accumulated End Offset 1−Accumulated End Offset 0.

SGL element 2 Fragment Length=Accumulated End Offset 2−Accumulated End Offset 1.

SGL element 3 Fragment Length=Accumulated End Offset 3−Accumulated End Offset 2.

Cache line memory space location fields 218 indicate a memory space location for an SG element represented in the cache line. In FIG. 6, specific memory space location fields 218 labeled S0, S1, S2 and S3 indicate the memory space location of SG elements 0, 1, 2 and 3 respectively. In this embodiment of the cache organization, the cache line memory space location field 218 comprises a one-bit field provided to choose between two possible memory spaces. Additional bits can be added to the cache line memory space location field 218 in other embodiments where it is necessary to choose between more than two memory spaces. Alternatively, the cache line memory space location field 218 can be omitted in the situation where all SG elements reside in only one memory space. These choices are implementation dependent.

SGL element addresses 220 comprise the starting addresses of the fragments for the SG elements in the cache line. For example, SGL element 0 Address is a field that holds the starting address of the fragment contained in SG element 0. Similarly, SGL element 1 Address, SGL element 2 Address, and SGL element 3 Address fields hold the starting address of the fragment contained in SG elements 1, 2 and 3, respectively.

Figure 7:
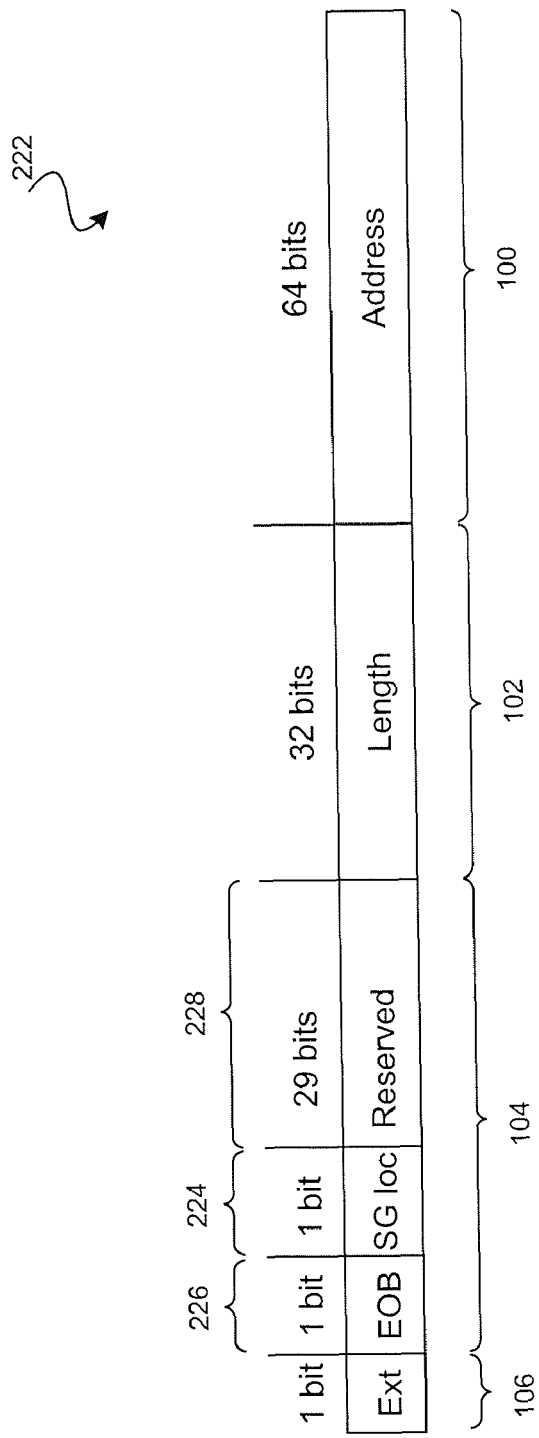
FIG. 7 illustrates a scatter gather element modification for multiple memory spaces and error recovery according to an embodiment of the present invention.

A format of a modified SG element according to an embodiment of the present invention is shown in FIG. 7. Such a modified SG element 222 can be used to support multiple memory spaces and error recovery. As many additional bits are introduced in the SG element as needed to keep track of the memory space location of the fragment contained in that element. For example, in a situation with two memory spaces A (denoted by '0') and B (denoted by '1'), one more of the originally 'Reserved' bits 104 in the SG element can be used to indicate the location of the fragment. This example is shown in FIG. 7, where the bit is called 'SG loc' 224, also referred to as a SG element memory space location indicator. This allows the flexibility of having a single SGL that mixes buffer fragments from different memory spaces.

In order to aid error recovery, a bit called SG element End-of-Buffer bit 226 is added, which specifies the end of the SG list. For this purpose, one of the originally 'Reserved' bits 104 (specifically, bit 31 in this embodiment) from the SG element is used. If this bit is set in an element, the SG cache will stop processing further elements in the SG list and will consider this element as the pointer to a last fragment. The remaining reserved bits 228 in the embodiment of FIG. 7 remain available for other purposes.

Figure 8:
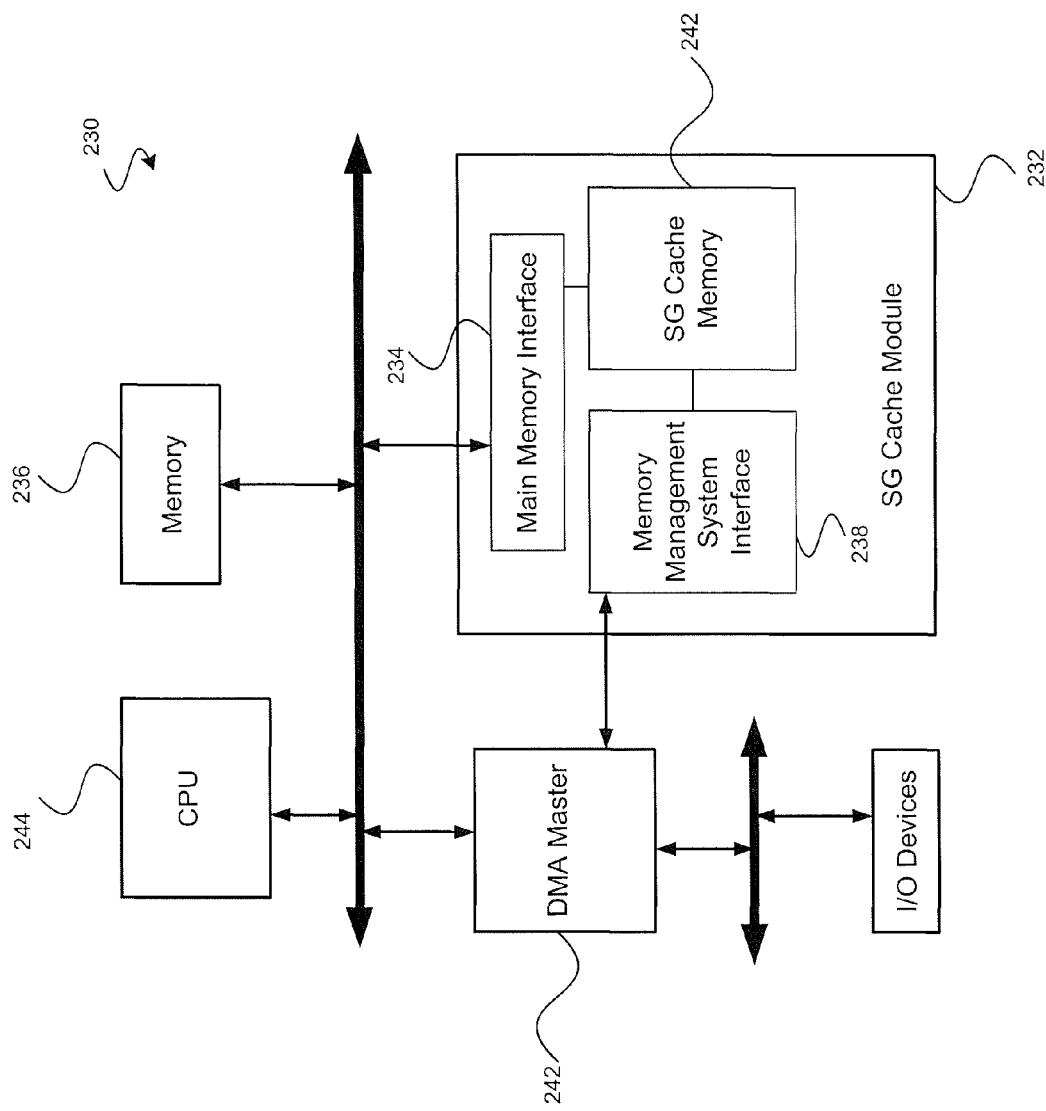
FIG. 8 illustrates an example of usage of an embodiment of the present invention in a DMA system.

FIG. 8 illustrates an example of usage of an embodiment of the present invention in a DMA system 230. As shown in the embodiment of FIG. 8, an SG cache module 232 can be introduced into a typical DMA system 230 to solve the problems described earlier. This embodiment is only one of several ways that the SG cache module 232 can be placed/used in a DMA system 230. The SG Cache module 232 contains, or includes, a main memory interface 234 to interface with a main memory 236 in order to read the SG lists and Descriptor Tables. A memory management system interface 238, such as a DMA master interface, interfaces with the memory management system controller, such as a DMA Master 240, to exchange information on the fragments. An SG cache memory 242 stores the SG cache line information.

Assume that CPU 244 initially creates the SG lists and assigns unique Source and Destination descriptor indexes and requests the DMA Master 242 to complete the DMA transfer. The DMA Master 242 then transmits the descriptor index for either the Source or Destination SG list and the transferred byte count (which is initially zero since we are beginning the transfer). The SG cache module 232 first accesses its own SG cache memory 242 to find out it had previously stored information pertaining to that particular descriptor (a 'hit'). If not, it then accesses the main memory 236 to find the descriptor table location for that particular descriptor index, which points to the starting address of the first SG element in the SG list. The SG cache module 232 then proceeds to read 64 bytes of data starting from the first SG element address (this is to get at least 4 SG elements worth of information, since each element is 16 bytes wide).

Figure 9:
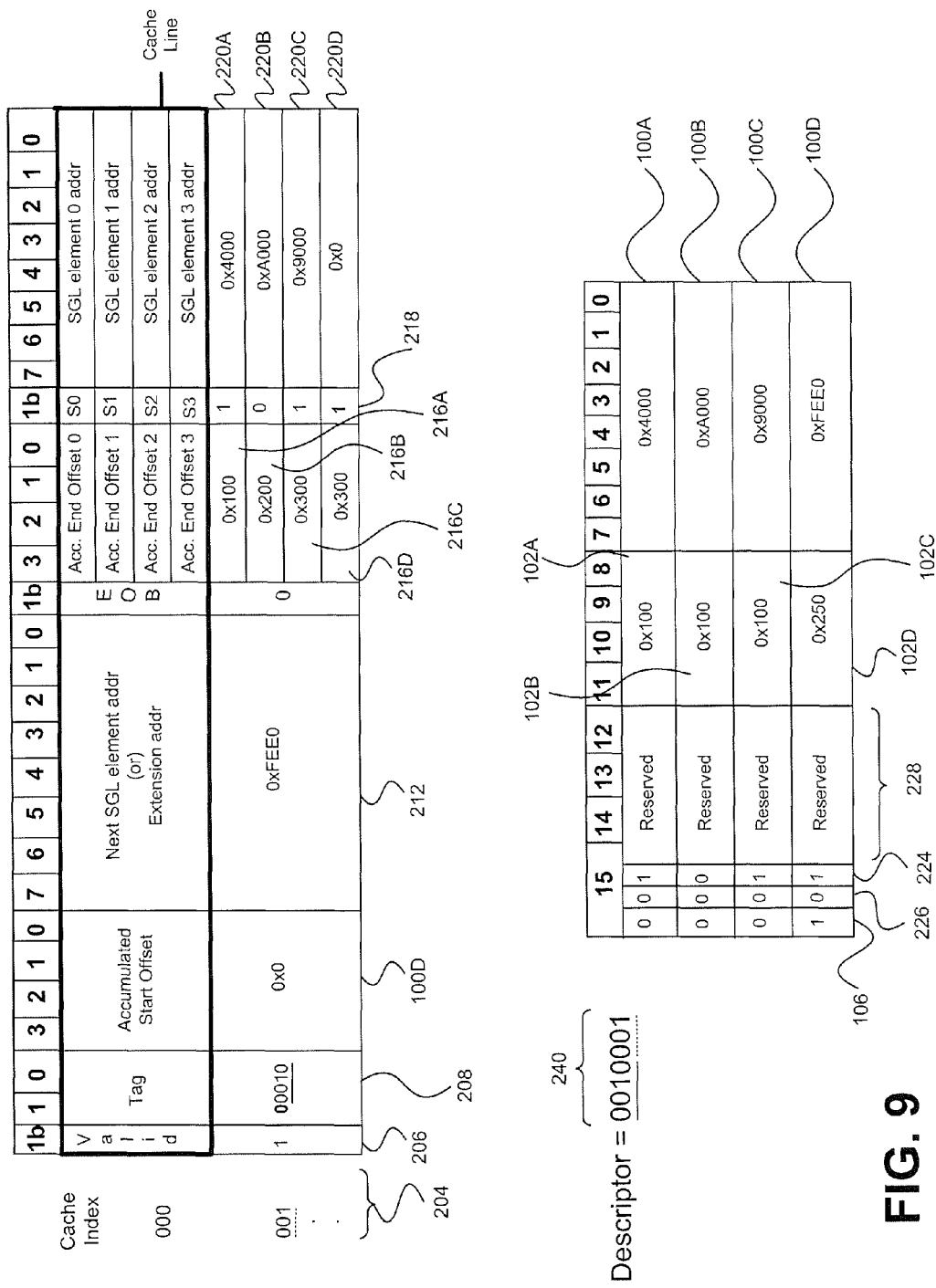
FIG. 9 illustrates cache line loading according to an embodiment of the present invention.

FIG. 9 shows how the SG cache module modifies and stores the information gathered by, or read into, a cache line. This modification of the SG element prior to writing into the cache line improves the performance of the cache.

Assume that we have two memory spaces A and B, with the Descriptor Table located in memory space A (denoted by '0') and all but one of the SG elements located in memory space B (denoted by '1'). Further, assume that a descriptor index 240 given to the cache is 0010001. Since the cache memory can be addressed with 3 bits (total of 8 entries in the cache), the higher order bits (0010) are stored in the Tag field 208 as shown in FIG. 9, along with the SG element memory space location information (0) for the Descriptor Table in the highest order bit. The lower order bits (001) of the descriptor are stored in the cache index 204 for that cache line.

From the 64 bytes that are read from the starting SG element address 100A, the cache can determine that there are four SG elements, with the fourth element being an extension SG element (since its Ext bit is set to '1'). The cache proceeds to load the elements into the cache line. In the embodiment of FIG. 9, the length fields of the SG elements are accumulated into the cache line. For example, length field 102A is copied as is to accumulated end offset field 216A. Accumulated end offset field 216B is the sum of the previous accumulated end offset 216A and length 102B of the second SG element, or the sum of lengths 102A and 102B. Similarly, accumulated end offset field 216C is the sum of the previous accumulated end offset 216B and length 102C of the third SG element, which can also be described as the sum of lengths 102A, 102B and 102C. Finally, accumulated end offset field 216D is identical to the previous value 216C, since the fourth SG element is an extension SG element. This can be described as computing an accumulated length value for storage in the one or more accumulated end offset fields by adding the length of a particular SG element to the length of all previous valid SG elements in the SG list. Valid SG elements in the SG list do not include extension elements or zero length fragments.

FIG. 9 also shows that the SG element memory space locations are copied over from the 'SG loc' field 224 of the SG element into the cache line memory space location fields 218. Also, the next SG element address information is taken from the address 100D of the extension SG element and stored in the cache line in field 212. Since the fourth SG element did not contain a valid fragment, it is stored in the cache as a null element (see address 220D) with the accumulated length field copied from the previous element. This is done to ensure that the cache recognizes that this element does not point to any data fragment. The Valid field 206 is also set to '1' to ensure that the next time the DMA Master requests information about this descriptor, the cache will read from this line first rather than go out to main memory to fetch data.

Once the line is loaded, the SG cache returns information about the first fragment to the DMA Master. The DMA Master will then gather or scatter data from this element and then increment the byte count to reflect that it has transferred the necessary bytes contained in this fragment. The DMA Master will then provide the SG cache with the same descriptor index and the incremented byte count and thereby request information for the next fragment. This time, the SG cache will read the information from its cache line and return data immediately (since it had previously stored information about the next fragment in the cache line). The DMA Master can then transfer data for this fragment. Once the DMA Master has exhausted all of the fragments contained in the SG cache line, the SG cache will once again go out to main memory to fetch the next SG elements to be stored in the cache using the Next SG Element Address. This process continues until the DMA Master finishes the DMA operation, at which time the CPU will instruct the DMA Master to retire the descriptor. At this point, the Valid bit is set to zero for the given descriptor in the cache line, which enables us to re-use the descriptor for a new transfer.

The benefits of using the cache will now be discussed, and compared to the existing DMA schemes.

Arbitrary fragment size and alignment: As seen from the structure of the SG cache in FIG. 6 or FIG. 9, there are no limitations on the size or the alignment of the SG fragment, which makes it an ideal choice for a memory management system that has arbitrary fragments. The SG cache maintains and stores the context and the memory space location of the fragments involved in an SG list. The SG cache fetches the entire 64-bit address of each fragment and returns this data to the DMA Master. There are also no restrictions on how the Descriptor Table or the SGL themselves are aligned in memory. Therefore the SG cache supports arbitrary alignment.

The SG cache also looks at and manipulates the entire contents of the Length field, and manipulates its contents to figure out the remaining byte count and other required variables. Since this field can have any value from 0 to $2^{32}-1$, the SG cache also supports any size of fragment.

Figure 10:
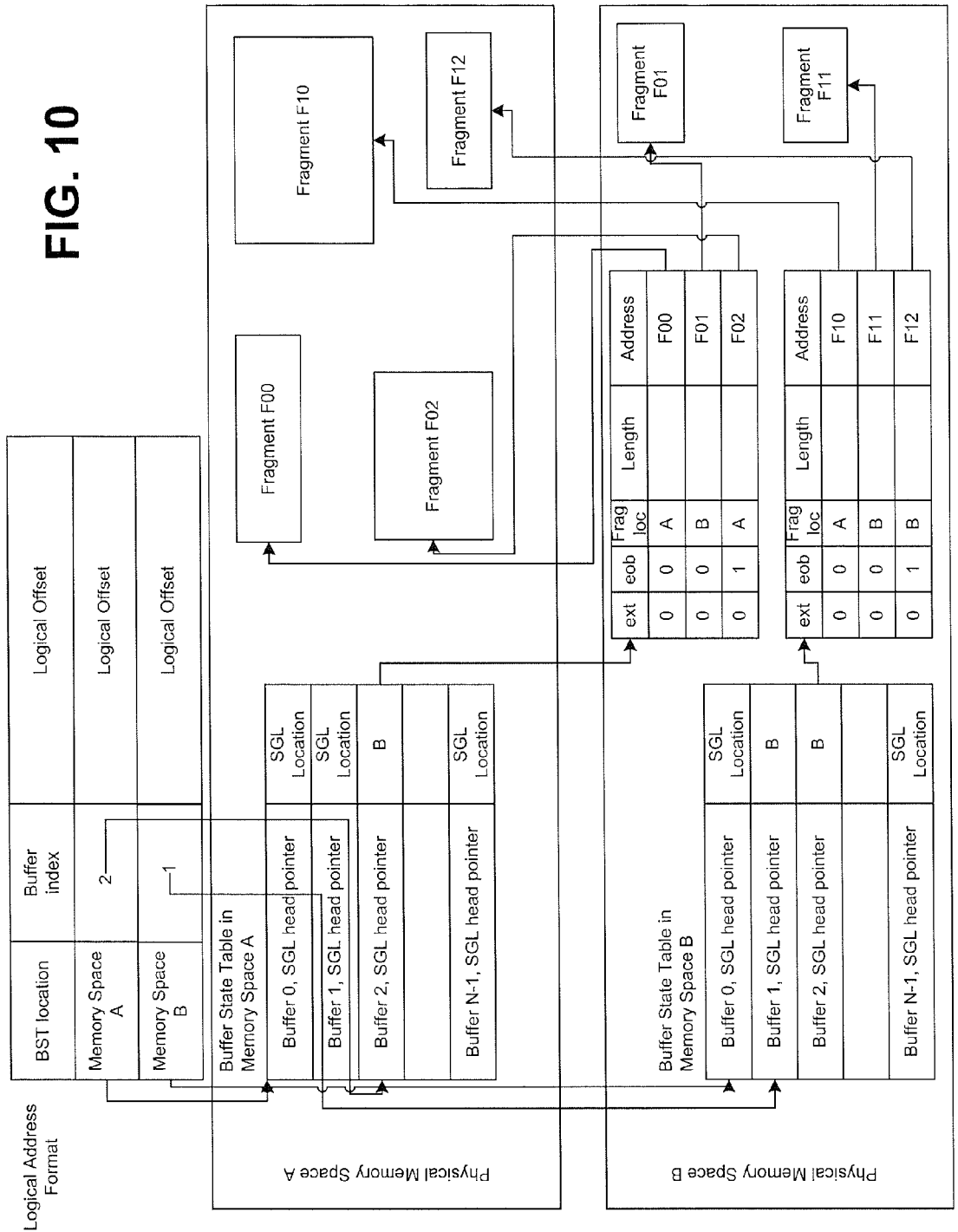
FIG. 10 illustrates support for multiple memory spaces according to an embodiment of the present invention, in particular how descriptor table(s), scatter gather list(s) and fragments can be located in different memory spaces.

Support for Multiple Memory Spaces: FIG. 10 shows how the Descriptor Table(s), Scatter Gather List(s) and the fragments themselves can be located in different memory spaces. (The example in the figure assumes only two memory spaces A and B, but this can be extended to as many as needed). The cache stores enough information to present the fragments as a logically contiguous buffer to the DMA Master.

Performance: The performance of the DMA operation will be considerably faster than in the conventional DMA case, due to several reasons. A major reason is the pre-fetching and buffering SG elements by the SG cache even before they are needed by the DMA Master. This allows the cache to return subsequent SG element information without accessing the main memory each time.

Figure 11:
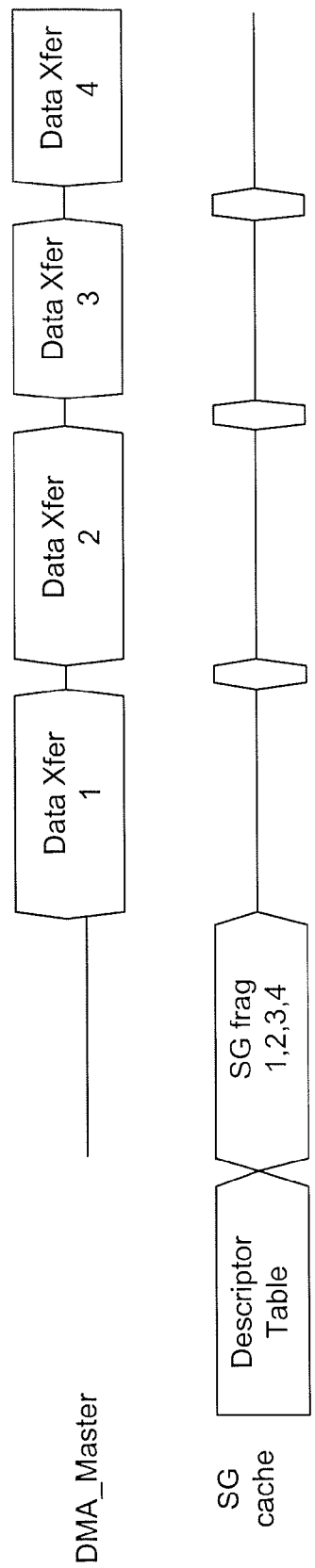
FIG. 11 illustrates a DMA timing with a scatter gather cache according to an embodiment of the present invention.

FIG. 11 illustrates a diagram of DMA timing with a scatter gather cache according to an embodiment of the present invention. Notice how the DMA Master is able to perform almost back-to-back fragment accesses due to the information being already stored in the cache.

Figure 12:
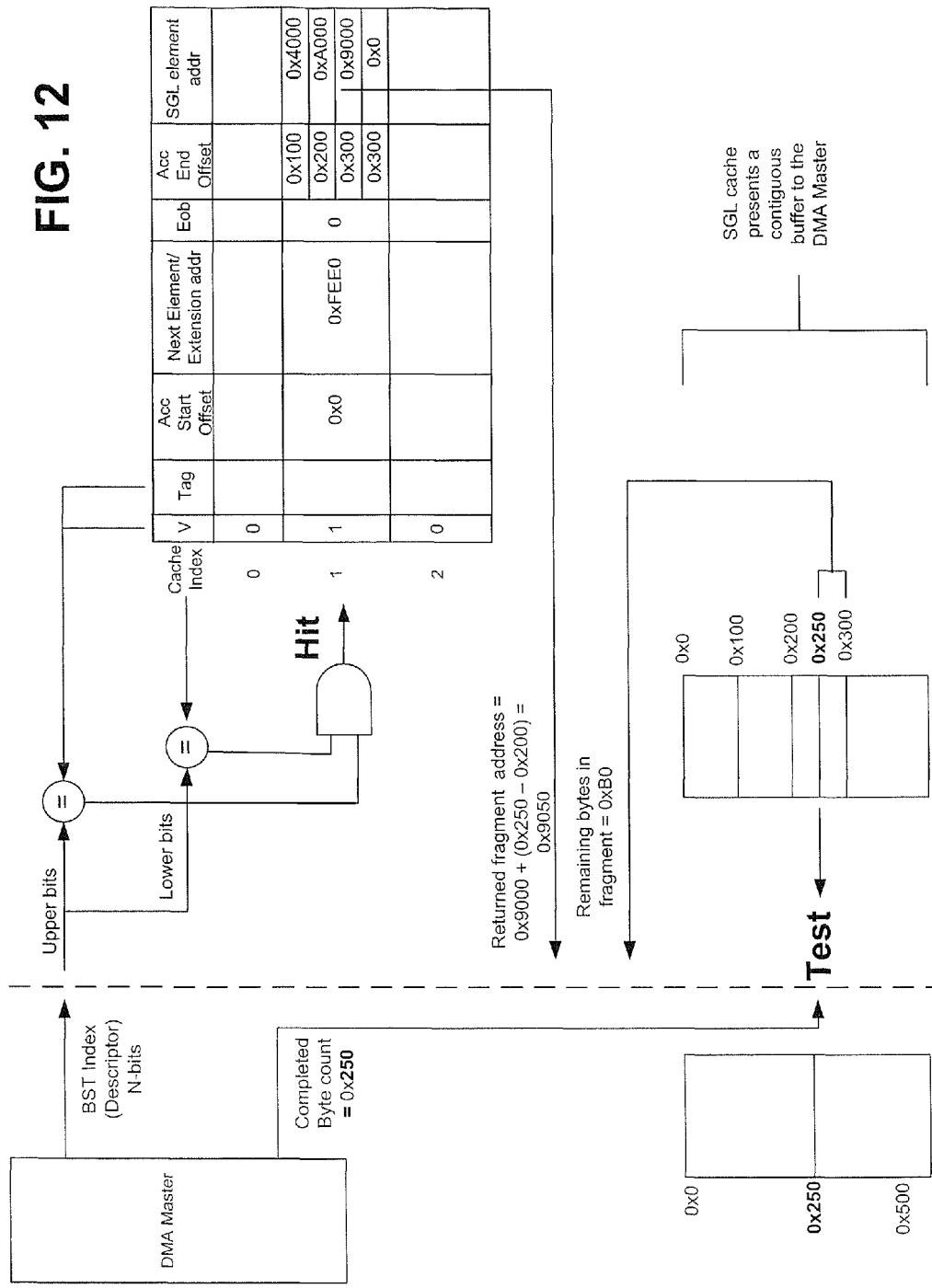
FIG. 12 illustrates a scatter gather cache "hit-test" mechanism according to an embodiment of the present invention.

Another feature of the cache that improves its performance is the accumulation of the Length fields of the fragments. By doing so, the cache avoids manipulating and updating the SG element data every time the Master requests a portion of a fragment. Instead, the cache simply performs a 'hit-test' mechanism on the contents stored in its cache line and returns data. FIG. 12 illustrates a scatter gather cache "hit-test" mechanism according to an embodiment of the present invention. A device according to an embodiment of the present invention can include a hit-test module, or means, to perform a hit-test method or procedure as described below.

The hit-test mechanism is used by the cache to determine whether the SG fragment information requested by the DMA Master resides in the cache, or if the cache should go out to main memory to fetch SG elements in order to satisfy the DMA Master's request. FIG. 12 represents a simplified caching system embodiment where the Descriptor contains only indexing information in the descriptor table and no memory space location information, as it is assumed that both the Descriptor table and the SG elements reside in the same and only memory space. (Alternative embodiments, as discussed earlier, can have more complex schemes. For example, the embodiment of FIG. 7 uses an SG loc bit 224 to locate the particular SG element in one of two memory spaces).

The DMA Master requests fragment address information from the cache by giving the cache the descriptor and a completed byte count (0x250 in this case), as seen in FIG. 12. The completed byte count indicates how many bytes the Master has already transferred for this particular SG list. The cache first checks to see if the particular descriptor's elements are present in any cache line, by indexing into the cache using the lower bits of the descriptor and matching the 'Tag' field bits with the upper bits of the descriptor. If there is a match and the Valid bit (V) is set to '1' for that particular cache line, then this constitutes a 'Hit' condition as the cache contains valid SG element information for that descriptor. FIG. 12 assumes that the cache has a 'Hit' on the descriptor supplied by the Master.

Once a 'Hit' has been established, the cache then proceeds to do a 'Test' whereby it compares the completed byte count supplied by the DMA Master to the Acc Start and End Offset fields. If the completed byte count lies between the values held in the Acc Start Offset and the last Acc End Offset (Acc End Offset 3), then this indicates that the cache contains the SG element that contains fragment information for the DMA Master. In this example, the Acc End Offset 3 has a value 0x300, and therefore the cache does contain information to be returned to the Master. The cache first tests whether the completed byte count rests between the Acc Start Offset and Acc End Offset 0, to see if SG element 0 contains the information to be returned to the Master. Since this is not true for the example in FIG. 12, it then tests whether the completed byte count rests between Acc End Offset 0 and Acc End Offset 1, to see if SG element 1 contains the information to be returned to the Master.

By following this process, the cache concludes that SG element 2 contains necessary information for the DMA Master, as the completed byte count (0x250) rests between Acc End Offset 1 (0x200) and Acc End Offset 2 (0x300). Simple addition and subtraction operations are then performed to supply the correct starting fragment address and remaining byte count in the fragment to the DMA Master, as seen in FIG. 12. This demonstrates one of the key purposes of using the Acc Start and End Offsets—it presents a contiguous buffer view to the DMA Master, also illustrated in FIG. 12.

Sometimes, the cache does have a 'Hit', but the 'Test' mechanism may reveal that the completed byte count is either lesser than the Acc Start Offset or greater than Acc End Offset 3. In the case that the completed byte count is lesser than the Acc Start Offset, the cache will first access the Descriptor table, find the first SG element address and proceed to fetch SG elements from the list until it finds the element that contains the fragment that the DMA Master requested. This is because, in the exemplary embodiment described in FIG. 12, there is no way to traverse an SG list backwards. If the completed byte count is greater than the Acc End Offset 3, then the cache will use the 'Next Element/Extension addr' field's value to access the next SG elements in the SG list.

In case there is no 'Hit' in the cache (either because the Valid bit is '0' or because of a 'Tag' mismatch), the scatter gather cache module will again go out to main memory to fetch SG element information. For either of the cases, the cache will first access the Descriptor table, find the first SG element address and proceed to fetch SG elements from the list until it finds the element that contains the fragment that the DMA Master requested. After the necessary set of SG elements have been found, the cache will load the cache line and set the Valid bit to a '1' (if not previously set), and put the upper bits of the descriptor into the Tag field.

Yet another factor that may improve performance is the prevention of unnecessary data movement due to arbitrarily aligned fragments with arbitrary sizes. As pointed out earlier, embodiments of the present invention have the added benefit of eliminating the extra step of managing the workspace buffer and the data movement between the data structure and the workspace, thereby making overall DMA transfers faster.

Notice in FIG. 12 how the SG cache simply compares its Accumulated End Offset fields with the Completed Byte Count from the DMA Master to figure out which SG element information it should return. This 'hit-test' mechanism also helps figure out whether the cache should access further elements down the list (if the Completed Byte Count>=Accumulated End Offset of the last fragment) or if it should traverse the list from the beginning (if the Completed Byte Count<Accumulated Start Offset). The SG cache returns the fragment's address and the remaining number of bytes left in the fragment, as seen in the Figure. Also note that, depending upon the number of SG elements stored, the SG Cache can perform a backward traversal easier than the DMA Master (for example in FIG. 11, if the DMA Master wanted to re-transfer data starting from the 0x100th byte, the SG Cache would return data from the 2nd SG element in the cache line.) This helps improve performance by not having to traverse the SG list from the beginning. A number of other modifications can also improve the performance further, which will be discussed later.

Maintaining Context: The SG Cache helps store the context of each descriptor index by storing the n currently relevant SG elements for that descriptor, where n is an integer that can be set based on system parameters, and generally equals the number of elements per cache line times the number of cache lines. As described previously, the remaining byte count and physical address are returned almost instantaneously on an access to the SG cache. This is very useful in improving performance when an SGL partial context needs to be reloaded by the DMA Master (when interleaving I/Os or on a retry). The DMA Master does not need to know any information about the length of each fragment or accumulate the number of bytes between fragments to calculate the total bytes transferred. This simplifies the DMA Master design. This is also particularly useful when (say) we have a system with multiple DMA Masters and one SG Cache—all of the information will be centralized, which simplifies the Master's design and makes debugging easier.

Error Recovery and Debug: The modification of the SG element to include an EOB bit helps in the Error Recovery and Debug process of a data transfer. If the EOB bit was set for a particular element, the cache would identify this as the last element in the list. Now, if the DMA Master requested data beyond the data contents of this element, the SG cache will then raise an error, which can be relayed to the CPU. The SG cache can hold the details of the failure (like Descriptor index, SG element details, byte count requested etc) in a couple of registers accessible to the CPU. The SG cache can also inform the DMA Master of the error. The DMA Master is therefore prevented from accessing areas of memory that could potentially cause a fatal failure. Also note that the DMA Master can now move on to other transfers if need be while the CPU debugs the cause of failure of this particular DMA transfer. This eases the debug process and prevents fatal memory errors compared to the conventional DMA process.

Some of the modifications that can be done to the cache, the SG element and the system will now be presented for various applications. The modifications presented below are not intended to be an exhaustive list. Other variations which can be done for a particular application will be evident in light of this description to one of ordinary skill in the art.

1. Descriptor Strategies: The number of bits in the descriptor can vary depending upon the size of the memory, the number of outstanding I/Os desired etc. These can be changed for minimizing the number of bits needed to identify the I/O (or) to produce a hit in the cache, thereby increasing performance. Another strategy is to do away with the Descriptor Table, and instead have the address of the first element in the SG list as the descriptor index. This has the advantage that it eliminates the need for a Descriptor Table, but uses more number of bits for the descriptor index.

2. Caching Strategies: As always, a number of caching strategies are possible, with each one yielding a different performance. Embodiments of the present invention were discussed using a direct-mapped cache that stored four SG elements, but this is not a restriction. Some of the straightforward improvements that are possible include changing the associativity (set associative or full associative caches), bigger cache line (to store more SG elements than just four (or) store other relevant information for faster performance). Other possible strategies include reducing the miss penalty (multi-level caches, victim caches) and reducing the miss rate (larger cache size, way prediction, pseudo-associativity).

3. SG element modifications: One of the modifications that was discussed above was the addition of an EOB element to the SG element. The SG element can be modified in other ways for better performance. For example, even with the addition of the memory space location bits and the EOB bit, there are still 29 Reserved bits 228 (see FIG. 7). This space can be used to store a partial address of the previous SG element, so as to make backward traversal easier. The operating system can put the lower 29-bits of the address of the previous SG element in the Reserved bit space of an SG element. This would restrict the available memory space for a given SG list (cannot be more than 512 MBytes, as we have to keep the upper 35 bits constant), but this may not be a huge restriction. With this approach, the cache can store this information gathered from the SG element and can traverse backward with almost the same efficiency as traversing forward.

4. Cache Line Modifications: The amount of information stored in each cache line about a particular SG list can be increased or decreased depending upon the system requirements for performance. For example, more than 4 consecutive SG elements can be stored in a cache line, or fewer than 4 elements, depending upon the desired performance. Another modification is to only store SG elements that have valid fragment information in the cache line. This means that the SG cache would traverse the SG list until it found valid SG elements while ignoring the extension or null SG elements, until it fills up its cache line (active pre-fetch). The cache line can also be modified to add other fields. For example, in addition to the cache line fields described earlier, a field that stores the address of the first SG element can be added. In case of a backward traversal, this would save an access to the Descriptor Table. Also, as mentioned above, the cache line can also store the lower bits of the previous SG element's address, making backward traversals more efficient.

Figure 13:
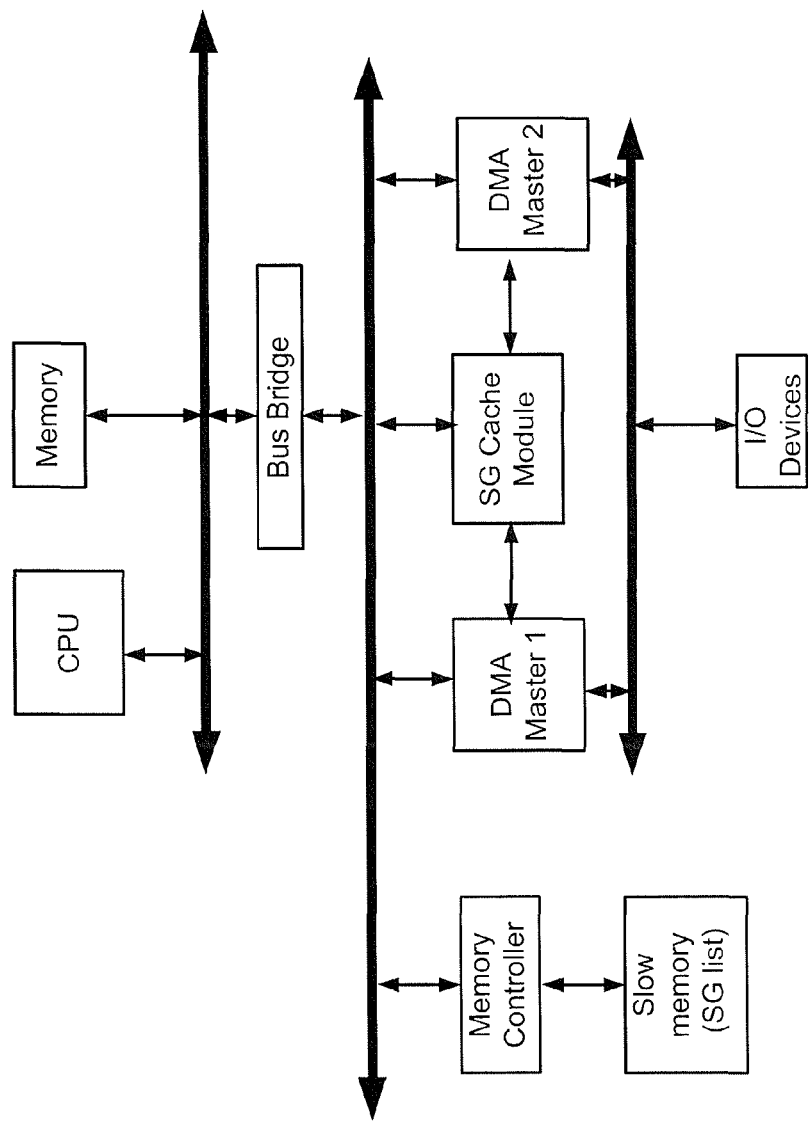
FIG. 13 illustrates a multi-master DMA system including a scatter gather cache according to an embodiment of the present invention.

5. Component Modifications: Given that the SG cache improves the performance of the DMA, the architecture can be modified to include lower performing components in favor of higher performing components in order to reduce cost. For example, the SG list can be held in a secondary memory that has a slower access time than the primary memory—this may not affect the performance of the DMA since the SG cache prefetches SG elements even before they are needed by the Master. Therefore, the latency of the memory is hidden from the DMA Master and the system performance will not suffer due to this change. An example of this implementation is shown in FIG. 13.

Figure 14:
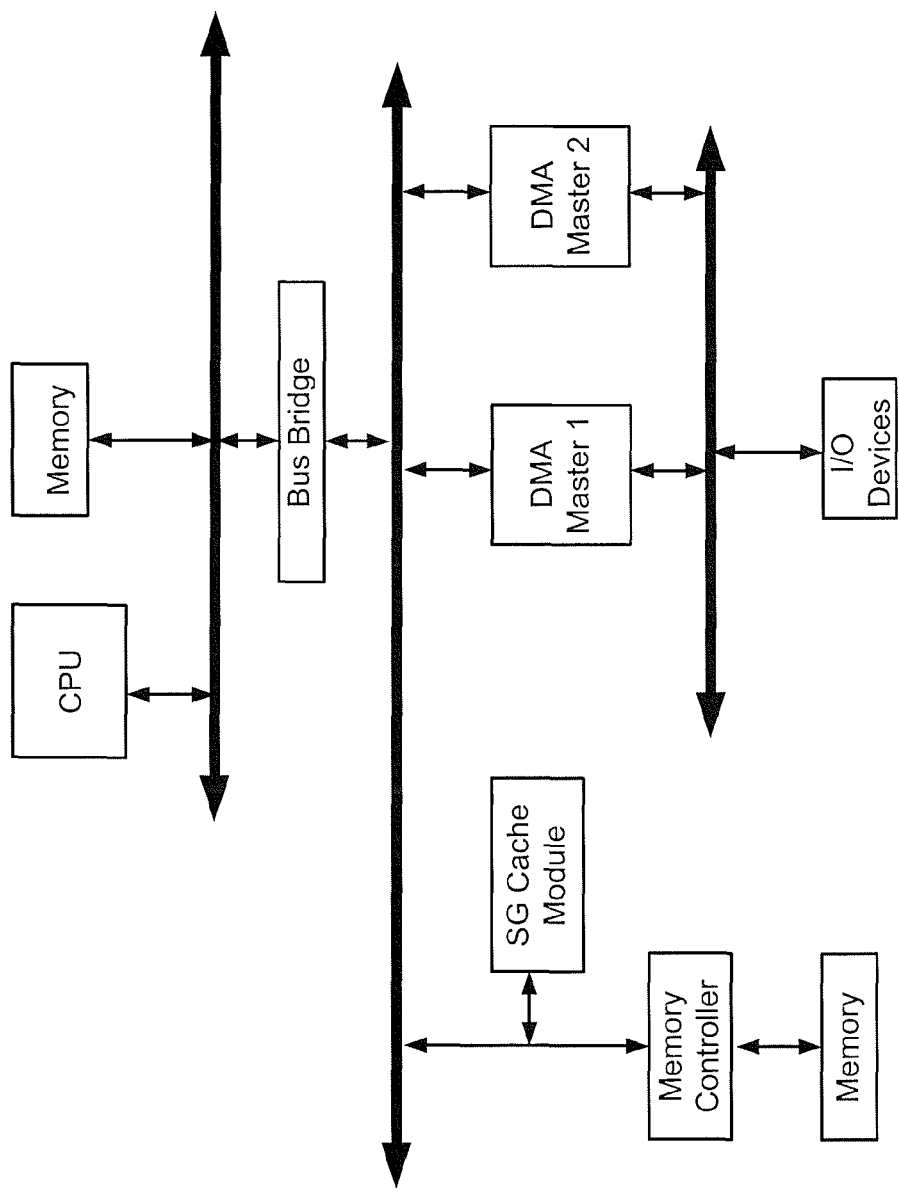
FIG. 14 illustrates a multi-master DMA system including a scatter gather cache according to another embodiment of the present invention where the cache is located near the memory.

6. Application based Modifications: The SG cache can also be modified based on the applications for which it is being used. We can take a look at several example systems to get an idea of how the cache can be used. Again, this is not intended to be an exhaustive list, but rather a guide to how simple modifications can enable the cache to be used in a wide variety of applications.

a) Multiple Master System:

One of the key advantages of the SG cache is that it can be used for storing SG list context for DMA transfers of multiple DMA Masters, without any modifications to its primary design algorithm. This is because the SG cache only stores information based on descriptors. This kind of system is especially useful in distributed or parallel processing systems with either uniform or non-uniform memory access protocols. Each Master can independently access the centralized SG cache that maintains context information for its transfers. Care should be taken to implement some sort of arbitration algorithm between the DMA Masters requests in case more than one DMA Master requests information from the cache, and also fine tune the parameters of the cache for the desired performance. FIG. 13 shows a system that has two DMA Masters using a single SG cache for DMA transfers. This system also employs a slower memory for storing the SG lists. The arbitration circuitry is not shown and is assumed to be inside the SG cache itself. Alternatively, each Master can also have its own SG cache instead of sharing a cache. This can improve performance at the cost of adding extra SG caches.

b) Locating the Cache near memory: Another possible system configuration is shown in FIG. 14, where we employ a sort of 'snooping' SG cache. This kind of configuration is particularly useful in systems that cannot modify the DMA Master for including support for the SG cache. It can also be used to make the SG cache totally transparent to the DMA Master(s). The SG cache is now located between the memory that holds the Descriptor Table and/or SG list and the memory bus. The SG cache can then snoop the bus to determine when a Descriptor Table or SG access occurs and then proactively pre-fetch the next couple of SG elements from the memory. This way, when a DMA Master requests an SG element from memory the SG cache would return the data instantly instead of the DMA Master having to read from memory. The protocols involved for this type of application of the SG cache are varied and any suitable protocol can be used.

Embodiments of the present invention can be implemented in the SAS RAID controllers, and in SPC SAS protocol controller devices.

Embodiments of the present invention are generic enough that they can be implemented in any system utilizing a memory architecture that has arbitrarily aligned and sized fragments, which could mean any computer system. Also, embodiments of the present invention directly impact the architecture of RAID controllers in the server and external storage RAID controller market. Considering the high attachment rate of ROC in high volume server markets, embodiments of the present invention could directly affect how every server in the world is made.

Embodiments of the present invention provide an advantage of using a caching mechanism for logical to physical address translation without restrictions on size or alignment of the fragments, thereby providing an MMU for arbitrarily aligned and sized fragments. SG elements can be stored before they are needed (pre-fetching SG elements). SG elements can be modified before storage for improving performance (by not having to perform a write to the cache on every access from the Master). An SG element can be modified for error recovery purposes; for indicating memory space location of the fragment; and/or for storing information for improving performance (e.g. storing the previous SG element address for backward traversal). A hit-test strategy can be used to present a logically contiguous buffer to the DMA Master.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A scatter gather (SG) cache module, comprising:
   a main memory interface to read SG lists (SGLs) and descriptor tables from main memory and to modify SG element information prior to storage;
   an SG cache memory for storing SG element context in one or more cache lines including modified SG element information regarding one or more SG elements for a particular descriptor; and
   a memory management system interface to interface with a memory management system controller to exchange information about SG elements,
   wherein the main memory interface manipulates the entire contents of the length field of an SG element to calculate an accumulated length value for storage in the cache line, and determines a remaining byte count for the SGL based on the calculated accumulated length value.

2. The SG cache module of claim 1 wherein the SG cache memory stores SG element context and memory space location for memory fragments with non-uniform alignment and/or length.

3. The SG cache module of claim 1 wherein the main memory interface compresses SG element information prior to storage in the SG cache memory.

4. The SG cache module of claim 1 wherein the main memory interface removes reserved bits from the SG element information prior to storage in the SG cache memory.

5. The SG cache module of claim 1 wherein the main memory interface proactively pre-fetches SG elements before they are needed by a memory management system controller.

6. The SG cache module of claim 1 wherein the memory management system interface comprises a DMA master interface to interface with a DMA Master.

7. The SG cache module of claim 6 further comprising a hit-test module to provide a contiguous buffer view to the DMA master.

8. The SG cache module of claim 1 wherein the one or more cache lines store a partial address of a previous SG element to permit traversing backward through the SGL.

9. The SG cache module of claim 1 wherein the one or more cache lines comprise:

an accumulated start offset field including information to calculate the amount of data contained in a fragment referenced by a particular SGL element;

one or more accumulated end offset fields containing information required to calculate the amount of data contained in memory fragments referenced by the one or more SG elements;

one or more cache line memory space location fields to indicate a memory space location for each SG element represented in the cache line; and one or more SGL element addresses including the starting address of the memory fragments referenced by the one or more SG elements in the cache line.

10. The SG cache module of claim 9 wherein the main memory interface computes an accumulated length value for storage in the one or more accumulated end offset fields by adding the length of a particular SG element to the length of all previous valid SG elements in the SGL.

11. The SG cache module of claim 10 wherein the main memory interface omits the length of an extension SG element in the computation of the accumulated length value.

12. The SG cache module of claim 9 wherein each cache line further comprises:
   a valid field to indicate whether the current line contains valid information, or if the cache location is empty;
   a tag field to hold upper bits of a descriptor index and memory space location of the corresponding descriptor table; and
   a next SG element/extension address field to store the starting address of the next SG element in the current SG list that occurs after the last SG element in the cache line.

13. The SG cache module of claim 12 wherein the tag field comprises a bit to associate a DMA master with SG elements stored in the cache line.

14. The SG cache module of claim 12 further comprising a hit-test module to determine whether SG fragment information requested by a DMA master resides in the cache based on a comparison of tag field bits with upper bits of the descriptor and a comparison of a completed byte count with the accumulated start and end offset fields, and a value of the valid field.

15. The SG cache module of claim 9 wherein each cache line further comprises a field that stores the address of the first SG element in a cache line.

16. A method for logical to physical address translation for arbitrarily aligned and arbitrarily sized segment based memory management schemes comprising:
   receiving a descriptor index and transferred byte count from a memory management system controller;
   accessing a scatter gather (SG) cache memory to determine whether information is stored pertaining to the received descriptor and, if not, accessing a main memory to find a descriptor table location for the descriptor index, which points to the starting address of the first SG element in the SG list;
   storing the highest order bits of the descriptor index in a tag field in the SG cache memory, along with SG element memory space location information for the descriptor table;
   reading each SG element and preparing for modification and storage of SG element information into a cache line in the SG cache memory;
   for each SG element read, accumulating length fields into the cache line by adding the length of a current SG element to the length of all previous SG elements in the cache line, and copying an SG element memory space location;
   for each cache line, copying next SG element address information from the last address in the cache line; and
   returning information about the first segment to the memory management system controller.

17. The method of claim 16 further comprising comparing an accumulated length field value with a completed byte count to determine which SG element information to return.

18. A direct memory access (DMA) system comprising:
   a system bus;
   a central processing unit (CPU) connected to the system bus;
   a main memory connected to the system bus;
   a DMA master connected to the system bus and in communication with input/output devices; and
   a scatter gather (SG) cache module connected to the system bus and including:
      a main memory interface to read SG lists (SGLs) and descriptor tables from the main memory and to modify SG element information prior to storage;
      an SG cache memory for storing SG element context in one or more cache lines including modified SG element information regarding one or more SG elements for a particular descriptor; and
      a DMA master interface to interface with the DMA master to exchange information about SG elements.

19. The system of claim 18 wherein the SGLs are stored in secondary memory that has slower access time than the main memory.

20. The system of claim 18 further including a second DMA master, wherein the SG cache module further includes a second DMA master interface to permit the SG cache module to be shared between the two DMA masters.

21. The system of claim 18 further including a second DMA master and a second SG cache module for dedicated interaction with the second DMA master.

22. The system of claim 18 wherein the SG cache module is located between the memory that holds the descriptor table and/or the SGLs and the system bus to determine whether a descriptor table or SG access occurs and proactively pre-fetch SG elements from memory.

* * * * *